(12) United States Patent
Shin

(10) Patent No.: US 12,170,385 B2
(45) Date of Patent: Dec. 17, 2024

(54) MODULAR BATTERY PACK FOR ENERGY STORAGE SYSTEM

(71) Applicant: LG ENERGY SOLUTION, LTD., Seoul (KR)

(72) Inventor: Jung-Il Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 472 days.

(21) Appl. No.: 17/624,779

(22) PCT Filed: Mar. 16, 2021

(86) PCT No.: PCT/KR2021/003259
§ 371 (c)(1),
(2) Date: Jan. 4, 2022

(87) PCT Pub. No.: WO2021/251596
PCT Pub. Date: Dec. 16, 2021

(65) Prior Publication Data
US 2022/0255197 A1    Aug. 11, 2022

(30) Foreign Application Priority Data
Jun. 11, 2020   (KR) .................. 10-2020-0071146

(51) Int. Cl.
*H01M 50/536* (2021.01)
*H01M 50/211* (2021.01)
(52) U.S. Cl.
CPC ....... *H01M 50/536* (2021.01); *H01M 50/211* (2021.01); *H01M 2220/10* (2013.01)

(58) Field of Classification Search
CPC ............. H01M 50/536; H01M 50/211; H01M 2220/10; H01M 50/258; H01M 50/51;
(Continued)

(56) References Cited
U.S. PATENT DOCUMENTS

2007/0141457 A1   6/2007   Amagai
2013/0130086 A1   5/2013   Schaefer
(Continued)

FOREIGN PATENT DOCUMENTS

CN    1988215 A      4/2007
EP    3 550 660 A1   10/2019
(Continued)

OTHER PUBLICATIONS

International Search Report for PCT/KR2021/003259 (PCT/ISA/210) mailed on Jun. 17, 2021.
(Continued)

*Primary Examiner* — Daniel S Gatewood
(74) *Attorney, Agent, or Firm* — Birch, Stewart, Kolasch & Birch, LLP

(57) ABSTRACT

The battery pack includes a casing, at least two battery cells, and a system including a cartridge in which the battery cell is received and a lead jig, wherein the cartridge is configured to be opened and closed to attach/detach the battery cell, and the lead jig is configured to be mounted/demounted on/from a lead of the battery cell, and when the battery cell is received in the cartridge and stacked in a thickness direction and the lead jig is mounted on the lead of the battery cell, an electrical connection is established between the battery cells without welding the leads of the battery cells.

9 Claims, 14 Drawing Sheets

(58) Field of Classification Search
CPC ............ H01M 50/514; H01M 50/517; H01M 50/502; H01M 50/20; H01M 50/116; H01M 50/124
See application file for complete search history.

(56) References Cited

U.S. PATENT DOCUMENTS

| | | | |
|---|---|---|---|
| 2014/0308557 | A1 | 10/2014 | Ebisawa et al. |
| 2015/0037642 | A1* | 2/2015 | Pinon .................. H01M 50/517 |
| | | | 429/99 |
| 2015/0037648 | A1 | 2/2015 | Nguyen et al. |
| 2015/0171399 | A1 | 6/2015 | Jeong |
| 2015/0303419 | A1 | 10/2015 | Hachiya et al. |
| 2016/0149256 | A1 | 5/2016 | Leroux |
| 2018/0013124 | A1 | 1/2018 | Balaster |
| 2018/0261809 | A1* | 9/2018 | Choi .................. H01M 50/271 |

FOREIGN PATENT DOCUMENTS

| | | | | |
|---|---|---|---|---|
| JP | 2006286357 | A | * | 10/2006 |
| JP | 2007-87907 | A | | 4/2007 |
| JP | 2010118625 | A | * | 5/2010 |
| JP | 2013-140710 | A | | 7/2013 |
| JP | 2015-133289 | A | | 7/2015 |
| JP | 2016-31794 | A | | 3/2016 |
| JP | 2016-526778 | A | | 9/2016 |
| JP | 2018-510465 | A | | 4/2018 |
| JP | 2019-525441 | A | | 9/2019 |
| KR | 10-2014-0091102 | A | | 7/2014 |
| KR | 10-1558694 | B1 | | 10/2015 |
| KR | 10-2016-0057150 | A | | 5/2016 |
| KR | 10-2017-0021631 | A | | 2/2017 |
| KR | 10-2017-0138198 | A | | 12/2017 |
| KR | 20170138198 | A | * | 12/2017 |
| KR | 10-1826932 | B1 | | 2/2018 |
| KR | 10-2018-0024972 | A | | 3/2018 |
| KR | 10-1978321 | B1 | | 5/2019 |
| WO | WO 2014/073524 | A1 | | 5/2014 |
| WO | WO 2014/126341 | A1 | | 8/2014 |

OTHER PUBLICATIONS

Extended European Search Report for European Application No. 21822072.1, dated Nov. 18, 2022.

* cited by examiner

MODULAR BATTERY PACK FOR ENERGY STORAGE SYSTEM

TECHNICAL FIELD

The present disclosure relates to a battery pack, and more particularly, to a battery pack for an Energy Storage System (ESS). The present application claims the benefit of Korean Patent Application No. 10-2020-0071146 filed on Jun. 11, 2020 with the Korean Intellectual Property Office, the disclosure of which is incorporated herein by reference in its entirety.

BACKGROUND ART

Attention is paid to lithium secondary batteries which can be repeatedly recharged as an alternative to fossil energy. Lithium secondary batteries have been primarily used in traditional hand-held devices such as mobile phones, video cameras and electric tools. Recently, there is a growing tendency of the range of applications of lithium secondary batteries to electric vehicles (EV, HEV, PHEV), uninterruptible power supply systems (UPSs) and energy storage systems (ESSs). For lithium secondary batteries to provide high voltage and high current, a battery module or battery pack is used in which a plurality of battery cells themselves or mounted in a cartridge is stacked to form a dense structure, and electrically connected to each other.

The ESS refers to a system which is supplied with external power from an external power source, for example, a power generation plant, stores it, and transmits the power to a desired location at a necessary time. In conjunction with smart grids, power from renewable energy sources such as solar power and wind power may be stored, and power may be supplied from external power sources at low times at which electricity rates are low and stored, and the stored power may be supplied at times when power consumption is high, thereby contributing to the high efficiency of power management from the position of power providers and low electricity costs from the position of customers.

There has been a trend in the development of ESSs towards higher capacity, but more recently, with the spread of home automation, increasing attention is paid to home small-scale ESSs to prevent power interruption in the event of power outages or for emergent use of electricity in regions with fluctuating electrical energy supply. Additionally, for efficient energy use, with the increasing government support for solar-powered housing, there is a growing demand for home ESSs.

A battery pack necessary for a home ESS may be manufactured by stacking a plurality of battery cells to form a dense structure, and electrically connecting them. Since the electrical connection is established by welding the leads of the battery cells, the battery module or battery pack in the form of a welded product is provided to customers. Problems may occur during the use of the battery pack, and the most common problem is deformation of the battery module caused by swelling of a specific battery cell and a voltage drop of the specific battery cell, and these problems are those occurring in the specific battery cell, not those occurring over the entire battery module.

Since the battery module assembled by welding cannot be disassembled into battery cells, it is impossible to replace only the specific battery cell. By this reason, even when a problem occurs in the specific battery cell, it is necessary to replace the entire battery module or battery pack.

DISCLOSURE

Technical Problem

The present disclosure is directed to providing a battery pack for a home energy storage system (ESS) which is so easy to separate and install a battery cell that a customer can replace the battery cell in person.

The technical problem of the present disclosure is not limited to the above-described technical problem, and other technical problem not mentioned herein will be clearly understood by those skilled in the art from the following description.

Technical Solution

To solve the above-described problem, a battery pack according to the present disclosure includes a casing, at least two battery cells, and a system including at least two cartridges in which the at least two battery cells are respectively received and a lead jig, wherein the at least two cartridges are configured to be opened and closed to attach and detach a respective one of the at least two battery cells, and the lead jig is configured to be mounted on and demounted from a lead of a battery cell of the at least two battery cells, and when the at least two battery cells are received in the at least two battery cartridges and stacked in a thickness direction and the lead jig is mounted on the lead of the battery cell, an electrical connection is established between the battery cells without welding the leads of the at least two battery cells.

In the present disclosure, each of the at least two battery cells may be a pouch type secondary battery of a flat shape including a laminated film for hermetic seal and the lead extending in two directions.

In this instance, wherein each battery cell of the at least two battery cells has two leads, the two leads extending from each of two ends of the battery cell, respectively, and the lead jig may be provided on each of the two leads.

In the present disclosure, the casing may include a case configured to receive the at least two battery cells to stack the at least two battery cells in the thickness direction and having an opening formed in at least one end.

In the present disclosure, the at least two cartridges may be press-fit into the casing.

In the present disclosure, each cartridge of the at least two cartridges may include a pair of frames to support edges of the battery cell while exposing the lead of the battery cell, and snap buttons disposed on opposing sides between the pair of frames.

In the present disclosure, the lead jig may include a pair of conductive plates where the lead of the battery cell is inserted in between, and an adjustment member connected to reduce a distance between the pair of conductive plates so that the conductive plates compress the lead, or increase the distance between the conductive plates to separate the conductive plates from the lead.

In this instance, the adjustment member may be a lever member which moves one of the pair of conductive plates closer to and away from the lead.

In the present disclosure, the lead jig may further include a connecting bar to connect in series the lead of one battery cell of the at least two battery cells to the lead of an adjacent battery cell of the at least two battery cells.

Advantageous Effects

According to the present disclosure, since the cartridge in which the battery cells are received and the configuration for connection between the leads can be assembled/disassembled or attached/detached, it is possible to easily separate and install the battery cell of the battery pack for a home energy storage system (ESS) by mounting/demounting the jig and the cartridge. Accordingly, it is possible to reduce the burden for replacement of a specific battery cell when a problem occurs in the specific battery cell and eliminate the need to replace the entire battery module or battery pack due to the problem occurred in the specific battery cell.

According to the present disclosure, there is no need to weld the leads of the battery cells beforehand, i.e., before provided to customers, thereby achieving cost savings. It is possible to reduce damage to the casing which may occur during delivery of finished products. Since the battery cell, the casing and the system may be separately delivered, it is possible to achieve flexibility in products supply.

According to the present disclosure, it is possible to provide convenience in battery cell replacement and save the maintenance costs including A/S costs from the perspective of customers, and achieve the reduced manufacturing costs and improved efficiency attributed to flexibility in products supply from the perspective of manufacturers.

DETAILED DESCRIPTION

Figure 1:
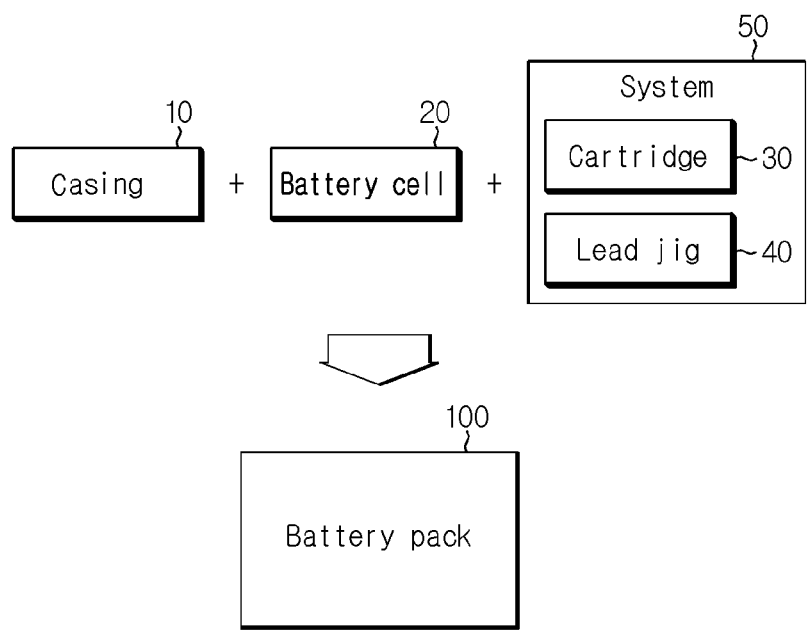
FIG. 1 is a block diagram conceptually showing a battery pack according to an embodiment of the present disclosure.

Hereinafter, the preferred embodiments of the present disclosure will be described in detail with reference to the accompanying drawings. However, the present disclosure is not limited to the disclosed embodiments and may be embodied in a variety of different forms and these embodiments are provided so that this disclosure will be thorough and complete, and will fully convey the scope of the present disclosure to those skilled in the art. Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The present disclosure manufactures an assemble type battery pack. The assemble type refers to a configuration in which individual parts can be assembled and disassembled depending on the purpose. The present disclosure proposes to provide customers with each of a casing, a system and a battery cell as disassembled, not welded together like the conventional battery module or battery pack, that is, each modular component, and assembling them at the destination.

Since it is not welded before delivered to customers, it is designed to attach/detach the battery cell of the battery module received in the casing.

FIG. 1 is a block diagram conceptually showing the battery pack according to an embodiment of the present disclosure. Additionally, FIG. 2 is a schematic diagram showing a simplest example of the battery pack of FIG. 1.

The battery pack 100 according to the present disclosure is a modular battery pack, and includes a casing 10, at least two battery cells 20 and a system 50. The system 50 includes a cartridge 30 in which the battery cells 20 are received and a lead jig 40. All the components may have an electric shock prevention function. Each component is provided to a customer as separated as shown in FIG. 1, and may be assembled into the battery pack 100 at the destination.

Figure 2:
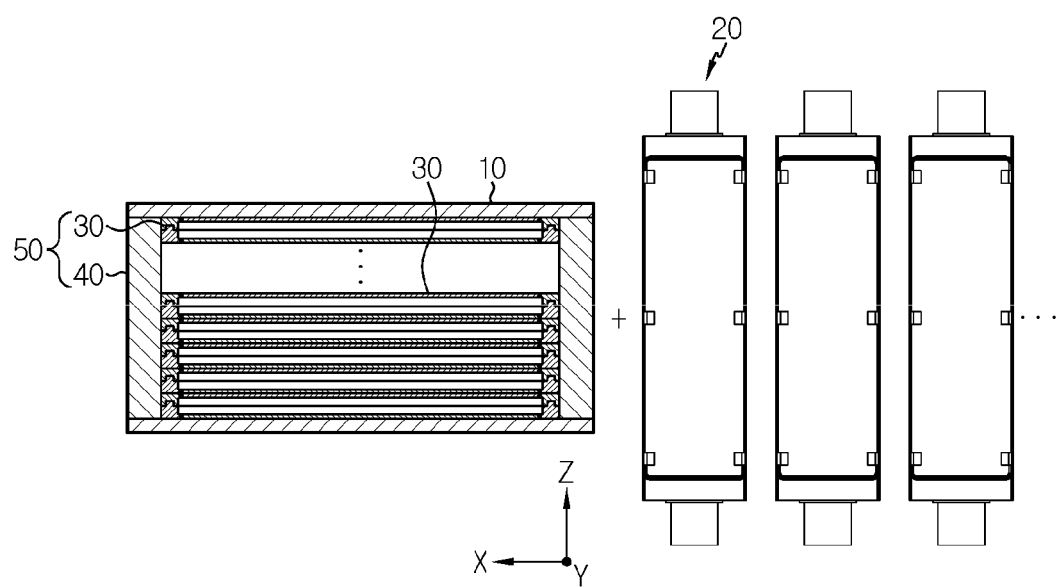
FIG. 2 is a schematic diagram showing a simplest example of the battery pack of FIG. 1.

As shown in FIG. 2, the system 50 may be mounted in the casing 10. The system 50 mounted in the casing 10 and the battery cell 20 may be separately provided to the customer as shown in FIG. 2, and the customer only has to combine the battery cell 20 with the cartridge 30 and the lead jig 40 at the destination. That is, since the system 50 has been already completed, to use, just combine the battery cell 20 with the cartridge 30 and the lead jig 40.

The cartridge 30 is used to receive the battery cell 20 therein and stack in the thicknesswise direction within the casing 10. The cartridge 30 is configured to be opened and closed to attach/detach the battery cell 20.

The lead jig 40 is configured to be mounted/demounted on/from the lead of the battery cell 20. When the battery cell 20 is received in the cartridge 30 and the lead jig 40 is mounted on the lead of the battery cell 20, electrical connection between the battery cells 20 is established without welding the leads of the battery cells 20.

When the casing 10 having the system 50 mounted thereon is provided to the customer, the customer puts the battery cell 20 in the cartridge 30 and places in the lead jig 40. When the casing 10 and the system 50 are separately provided to the customer, the customer may mount the system 50 in the casing 10, put the battery cell 20 in the cartridge 30 and place in the lead jig 40. Alternatively, the customer may put the battery cell 20 in the cartridge 30 and stack, then place in the lead jig 40, and put both the battery cell 20 and the system 50 in the casing 10.

Figure 3:
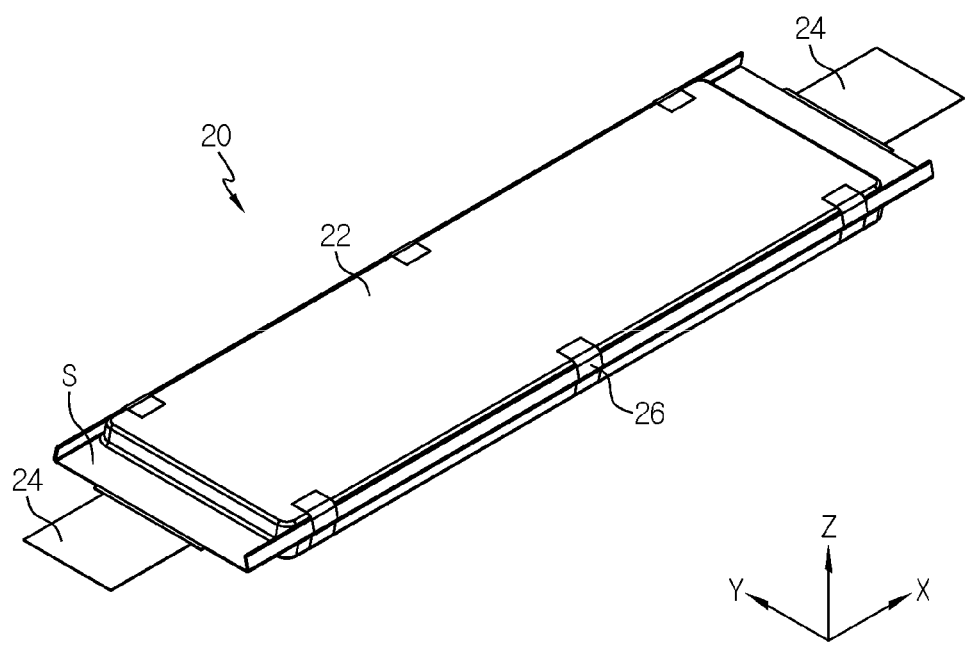
FIG. 3 is a diagram showing the structure of a battery cell that may be included in a battery pack of the present disclosure.

FIG. 3 is a diagram showing the structure of the battery cell 20 that may be included in the battery pack of the present disclosure. The battery cell 20 may be a pouch type secondary battery of a flat shape including a laminated film 22 for a hermetic seal and the lead 24 extending in two directions.

The pouch type secondary battery may include an electrode assembly and an electrolyte solution in the laminated film 22. Here, the electrode assembly may include at least one positive electrode plate and at least one negative electrode plate with a separator interposed between. More specifically, the electrode assembly may be divided into a roll type electrode assembly in which one positive electrode plate and one negative electrode plate are rolled together with a separator, and a stack type electrode assembly in which a plurality of positive electrode plates and a plurality of negative electrode plates are stacked in an alternating manner with a separator interposed between.

Additionally, the laminated film 22 may include an outer insulating layer, a metal layer and an inner adhesive layer. The laminated film 22 may receive the electrode assembly therein. In particular, in the shown example, the electrode assembly is interposed between two laminated films 22, and a sealing region S is formed by welding along the periphery of the electrode assembly with the inner adhesive layers of the laminated films 22 in contact with each other to seal an internal space in which the electrode assembly is received. In this instance, the lead 24 connected to the electrode assembly may extend leftward and rightward from the battery cell 20. A part of the sealing region S where the lead 24 does not extend may be wing-folded, for example, folded in the thicknesswise direction of the battery cell 20 and finished with a tape 26.

Here, when the thicknesswise direction of the battery cell 20 is referred to as a Z-axis direction, the battery cell 20 has a flat shape such that a surface perpendicular to the Z-axis direction has a widest area. When a direction in which the lead 24 extends from the battery cell 20 is referred to as an X-axis direction, it may be understood that the sealing region S placed in a Y-axis direction perpendicular to the X-axis direction is wing-folded. One lead 24 is positive and the other is negative. In this embodiment, the battery cell 20 is formed in a rectangular shape having two long sides and two short sides along the periphery, and the two short sides are placed perpendicular to the X axis in the X-axis direction and the lead 24 extends to form a terrace. The two long sides are placed perpendicular to the Y axis in the Y-axis direction.

The above-described pouch type secondary battery is obvious to those skilled in the art, and its detailed description is omitted herein. In addition to the battery cell 20 described above, the battery pack 100 according to the present disclosure may include various types of battery cells known at the time of filing the patent application.

Figure 4:
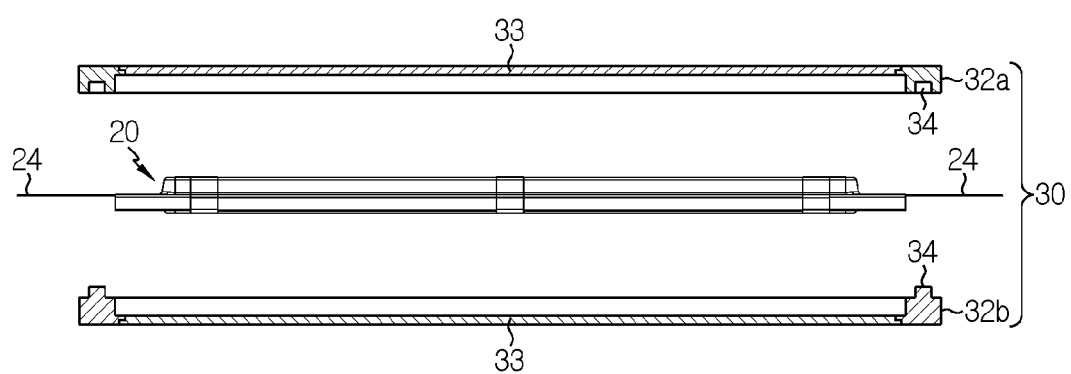
FIG. 4 is an exploded cross-sectional view of a cartridge that may be included in a battery pack of the present disclosure.
Figure 5:
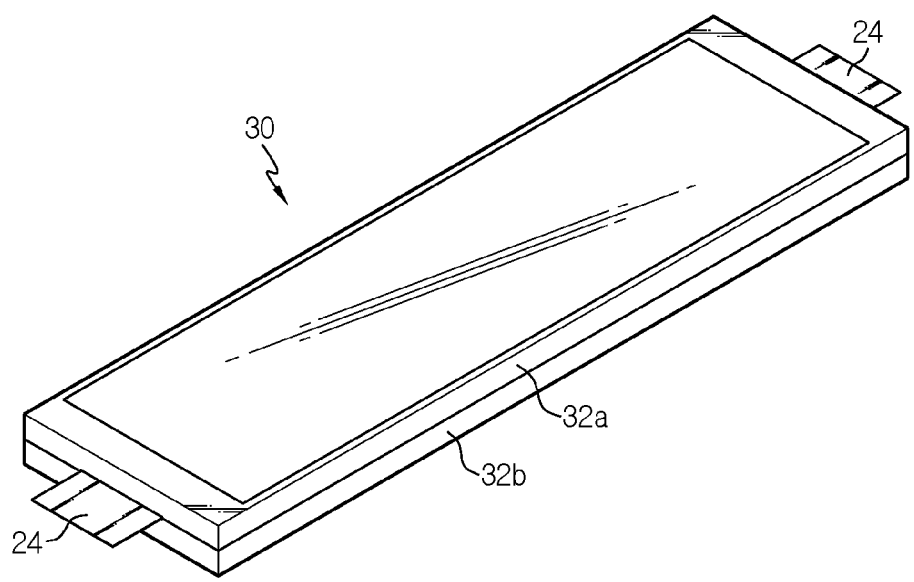
FIG. 5 is an assembled perspective view of a cartridge and a battery cell.

FIG. 4 is an exploded cross-sectional view of the cartridge that may be included in the battery pack of the present disclosure. FIG. 5 is an assembled perspective view of the cartridge and the battery cell.

Referring to FIGS. 4 and 5, when the battery cell 20 is received in the cartridge 30 and stacked in the thicknesswise direction, the cartridge 30 holds the battery cell 20 to prevent the battery cell 20 from moving. The cartridge 30 is configured to be opened and closed to attach/detach the battery cell 20. Specifically, the cartridge 30 includes a pair of frames 32a, 32b to support the edges of the battery cell 20 while exposing the lead 24 of the battery cell 20, and snap buttons 34 may be formed on opposing sides between the pair of frames 32a, 32b.

More specifically, when engaged, the pair of frames 32a, 32b may be approximately symmetrical, and may be a frame of a rectangular ring shape with the hollow center. The four edges of the pair of frames 32a, 32b are disposed on the periphery of the battery cell 20, and the battery cell 20 may be received in the internal space of the pair of frames 32a, 32b. To protect the battery cell 20 received in the cartridge 30 and improve the heat dissipation, a heat sink 33 may be further included on the inner side of the pair of frames 32a, 32b.

The key point is that the cartridge 30 is configured to be opened and closed to attach/detach the battery cell 20. When the battery cell 20 is received in between the pair of frames 32a, 32b and the snap buttons 34 formed on the opposing sides are engaged with each other, the cartridge 30 may stably support the battery cell 20. When the snap buttons 34 are disengaged, the pair of frames 32a, 32b may be separated, from which the battery cell 20 may be taken out. Instead of using the snap buttons 34, a hook coupling structure may be formed by engaging/disengaging a hook attached to one frame with/from a hook stop formed in the other frame. The cartridge 30 and the battery cell 20 may be assembled/disassembled to maximize the user convenience.

The casing 10 is configured to receive and store the battery cell 20 therein to protect the battery cell 20. Additionally, the casing 10 forms the shape of the entire battery pack 100. The casing 10 may have a receiving space for receiving the battery cell 20 by the unit of the cartridge 30. The inside and outside of the casing 10 need the insulating and flame retardant functions, and the casing 10 may have various types and shapes. Due to the limited space for installation in home, it is necessary to make the casing 10 and the entire system compact.

Figure 6:
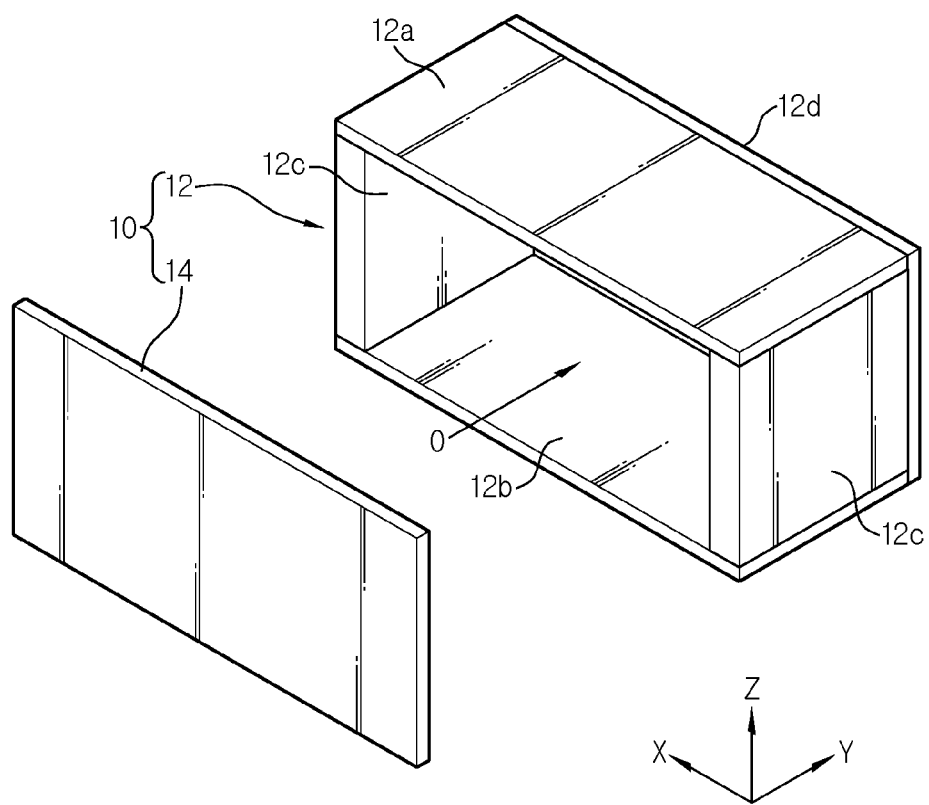
FIG. 6 shows an example of a casing that may be included in a battery pack of the present disclosure.

FIG. 6 shows an example of the casing 10 that may be included in the battery pack 100 of the present disclosure.

For example, the casing 10 may include a case 12 in which the battery cell 20 is received to stack in the thicknesswise direction and having an opening O formed in at least one end. The opening O may be formed at various locations, for example, top, bottom or side of the case 12. After all the battery cells 20 are received in the case 12, the opening O may be closed with a cover 14. The cover 14 is opened and closed. Although this embodiment shows that the opening O is disposed on the side of the case 12 and covered with the cover 14 to form an approximately rectangular box shape, the present disclosure is not limited to the shape of the casing 10.

The cartridge 30 may be press-fit into the casing 10. To this end, the case 12 may further include an auxiliary configuration for receiving the cartridge 30, for example, a groove structure into which the cartridge 30 is slidably inserted through the cartridge 30 the opening O or a protrusion such as a rack on which each cartridge 30 is placed. With the auxiliary configuration, each individual cartridge 30 may be pushed into place and received in the casing 10, and it is possible to support the battery cell 20 more stably. The battery pack 100 including the casing 10 may be manufactured to hold the battery cell 20 by the unit of the cartridge 30.

In this embodiment, the case 12 itself may be assembled. The case 12 may include a top plate 12a to cover the top of the battery cell 20 received in the topmost cartridge 30 in the Z-axis direction, a bottom plate 12b placed opposite the top plate 12a to cover the bottom of the battery cell 20 received in the bottommost cartridge 30, and a pair of side plates 12c connected to the top plate 12a and the bottom plate 12b and placed outside of the short sides of the battery cells 20. When assembled, a rectangular tubular shape having two open sides in the Y-axis direction may be formed. The case 12 may further include a rear plate 12d that vertically meets the top plate 12a, the bottom plate 12b and the side plates 12c to close one of the open sides. When the opening O is formed in the Y-axis direction and placed facing a user, the cover 14 becomes a front cover which covers the front side of the case 12. The battery pack 100 for use in home ESS may be formed in a wall-hanging shape for user convenience and space utilization, and installed on the indoor or outdoor wall or column. In this case, in general, a bracket for wall-mounting use may be added according to the properties of the corresponding product. Accordingly, the casing 10 may be fixed using the added bracket or a support such as a rack with the rear plate 12d placed facing the wall.

When the battery pack 100 needs maintenance and repair, the user may remove the cover 14 disposed on the front side to see the inner part of the case 12 in a straightforward manner. The cartridge 30 or the battery cell 20 may inserted or removed through the opening O. Of course, any other example of the casing 10 is possible.

Here, the top plate 12a, the bottom plate 12b, the side plates 12c and the rear plate 12d may be connected in contact with one another by bonding or bolting or using a hinge structure. Alternatively, any one may have a press-fit protrusion and the other may have a press-fit groove, and the top plate 12a, the bottom plate 12b, the side plates 12c and the rear plate 12d may be assembled by press-fitting. In this instance, each of the press-fit groove and the press-fit protrusion may be continuously formed along the vertical edges of the top plate 12a, the bottom plate 12b, the side plates 12c, and the rear plate 12d.

A fixing member may be included between the cover 14 and the case 12 to fix the cover 14 to the case 12.

Figure 7:
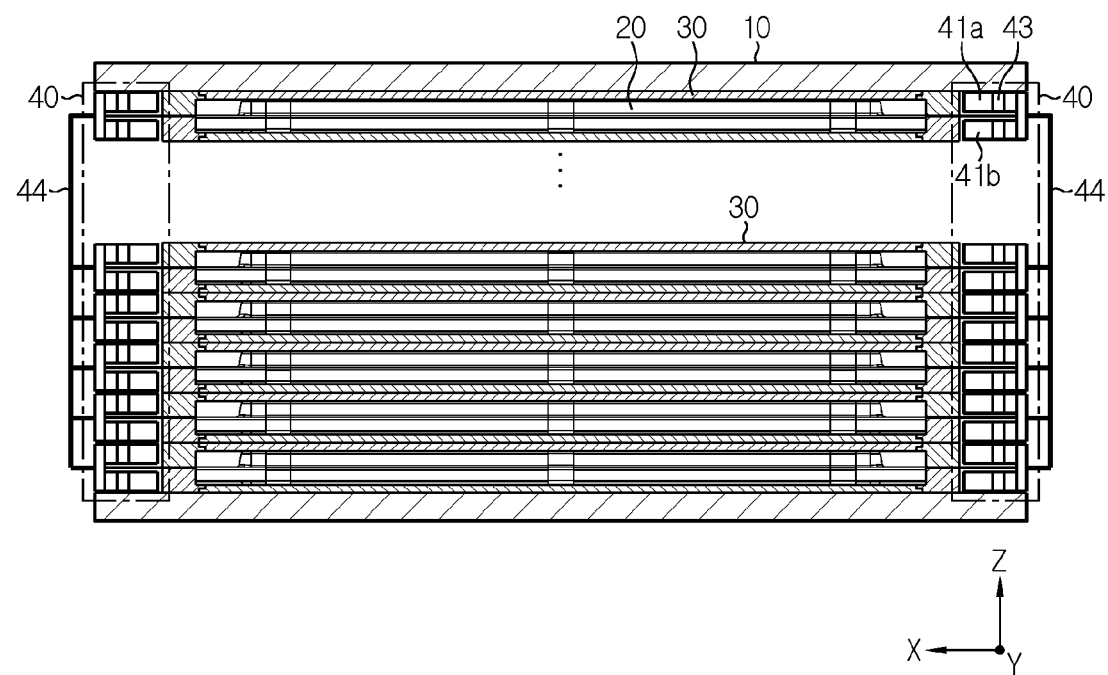
FIG. 7 is a schematic diagram of a lead jig that may be included in a battery pack of the present disclosure.

FIG. 7 is a schematic diagram of the lead jig 40 that may be included in the battery pack 100 of the present disclosure.

The lead jig 40 is configured to be mounted/demounted on/from the lead 24 of the battery cell 20. Specifically, the lead jig 40 may include a pair of conductive plates 41a, 41b and an adjustment member 43. Since the battery cell 20 has the bidirectional lead 24, the lead jig 40 may be provided in the two directions in which the lead 24 of the battery cell 20 extends. A unit including the pair of conductive plates 41a, 41b and the adjustment member 43 may be provided corresponding to the lead 24 of the battery cell 20 for each battery cell 20. The casing 10 may further include an auxiliary configuration to simply receive the units, fix after receiving, or install earlier than the cartridge 30.

The lead 24 of the battery cell 20 may be inserted in between the pair of conductive plates 41a, 41b. The pair of conductive plates 41a, 41b are provided with an area that is similar to or larger than the lead 24. The pair of conductive plates 41a, 41b further include a hole, through which a connection member such as a fastener or a screw is further provided, to allow the pair of conductive plates 41a, 41b to move in the Z-axis direction and prevent them from sliding or moving in the X-axis direction or Y-axis direction.

The adjustment member 43 is connected to the pair of conductive plates 41a, 41b to adjust the distance between the pair of conductive plates 41a, 41b, especially in the Z-axis direction. The adjustment member 43 may reduce the distance between the conductive plates 41a, 41b to compress the lead 24 inserted in between the pair of conductive plates 41a, 41b. Additionally, the adjustment member 43 may increase the distance between the conductive plates 41a, 41b to separate the conductive plates 41a, 41b from the lead 24. The distance between the pair of conductive plates 41a, 41b may be adjusted by allowing one or both of the conductive plates 41a, 41b to move in the Z-axis direction.

The system 50 is configured such that when the battery cell 20 is received in the cartridge 30 and stacked in the thicknesswise direction and the lead jig 40 is mounted on the lead 24 of the battery cell 20, electrical connection between the battery cells 20 is established without welding the leads 24 of the battery cells 20. For electrical connection between the battery cells 20, it is necessary to include a wiring between the lead jigs 40 connected to different battery cells 20. In particular, the lead jig 40 may further include a connecting bar 44 to connect in series the lead 24 of any one battery cell 20 to the lead 24 of the other adjacent battery cell 20 in the thicknesswise direction, that is, the Z-axis direction. Thus, a series connection may be established without a member such as a busbar through the connection between the two leads 24 stacked on top of each other in the thicknesswise direction on the side of the battery cells 20.

In the assembling of the battery pack 10, the battery cell 20 may be received in the cartridge 30 and stacked in the thicknesswise direction, and the lead jig 40 may be mounted on the lead 24 of the battery cell 20 to complete the battery module, and then received in the casing 10. In another example, the lead jig 40 may be installed in the casing 10, the cartridge 30 may be stacked in the casing 10, and at the same time, the lead 24 may be compressed through the lead jig 40. In still another example, the lead jig 40 may be installed in the casing 10, and each time the cartridge 30 is received in the casing 10, the lead 24 may be compressed through the lead jig 40.

Additionally, the casing 10 may further include the auxiliary configuration to simply receive the lead jig 40, fix after receiving, or install earlier than the cartridge 30. Most preferably, the lead jig 40 may be installed in the casing 10, and the cartridge 30 may be inserted into the case 12 along the Y-axis direction like putting books on a bookshelf and assembled along the Z-axis direction, or to the contrary, removed and separated one by one.

Figure 8:
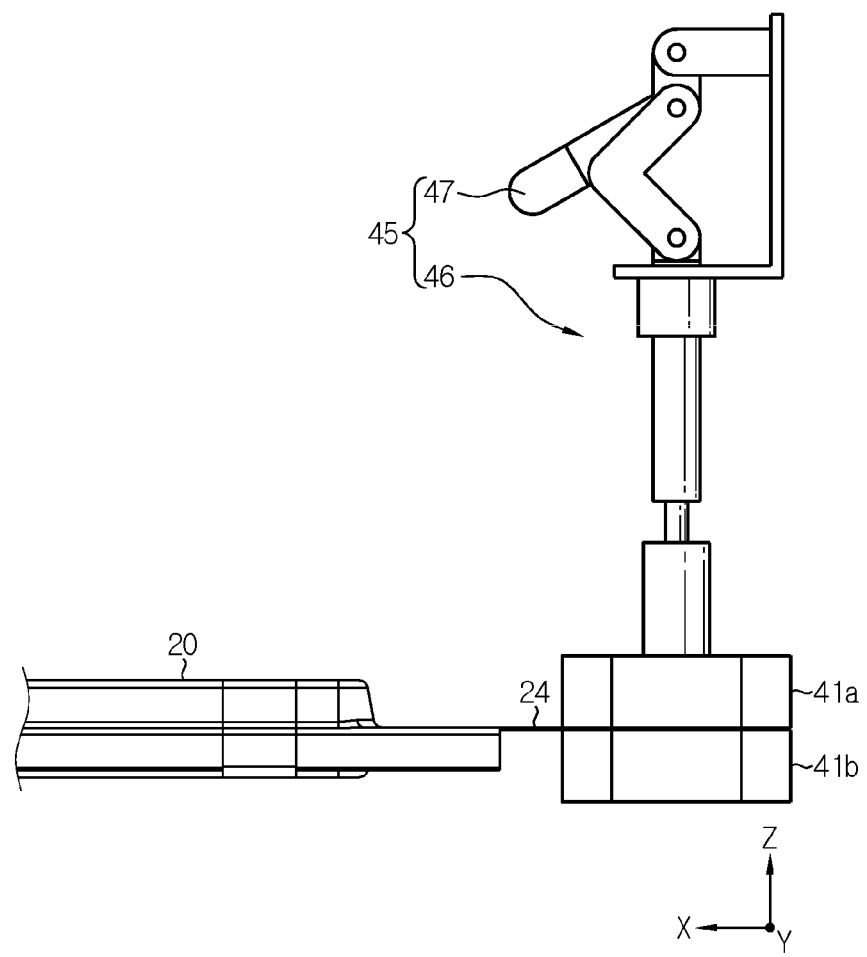
FIGS. 8 and 9 are side views illustrating a method of using an embodiment of a lead jig.
Figure 9:
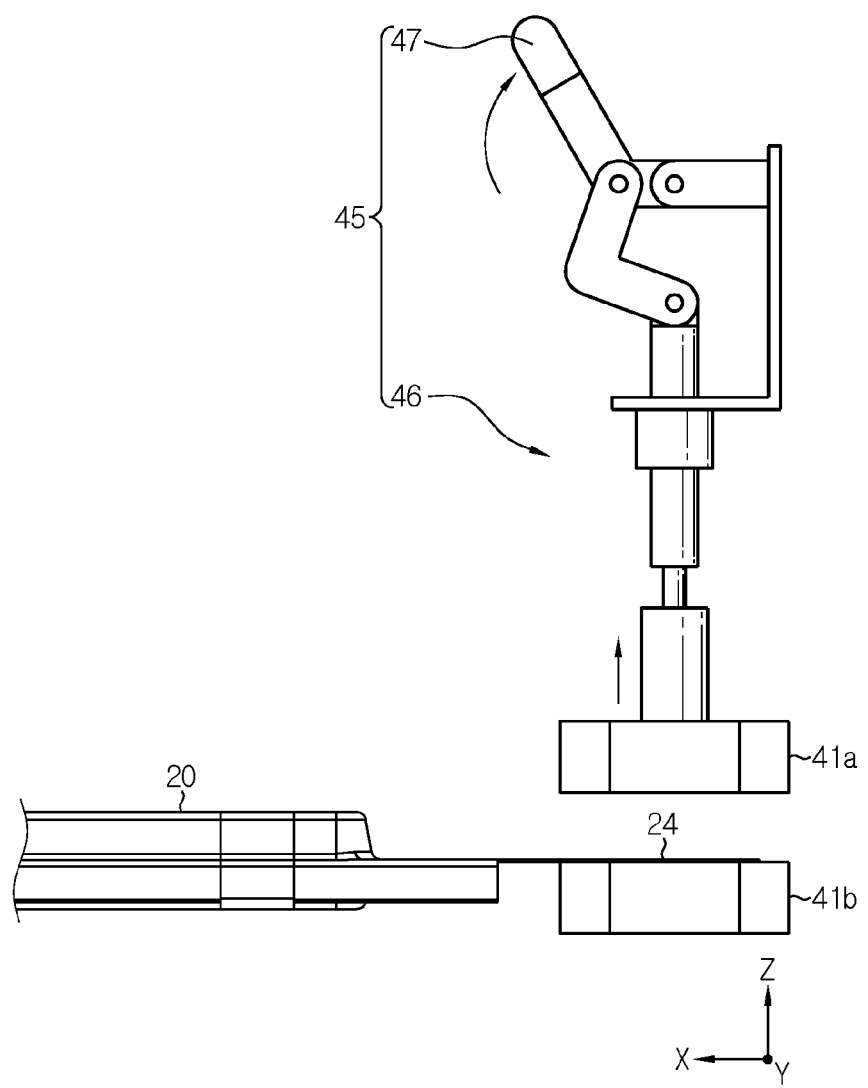
Figure 10:
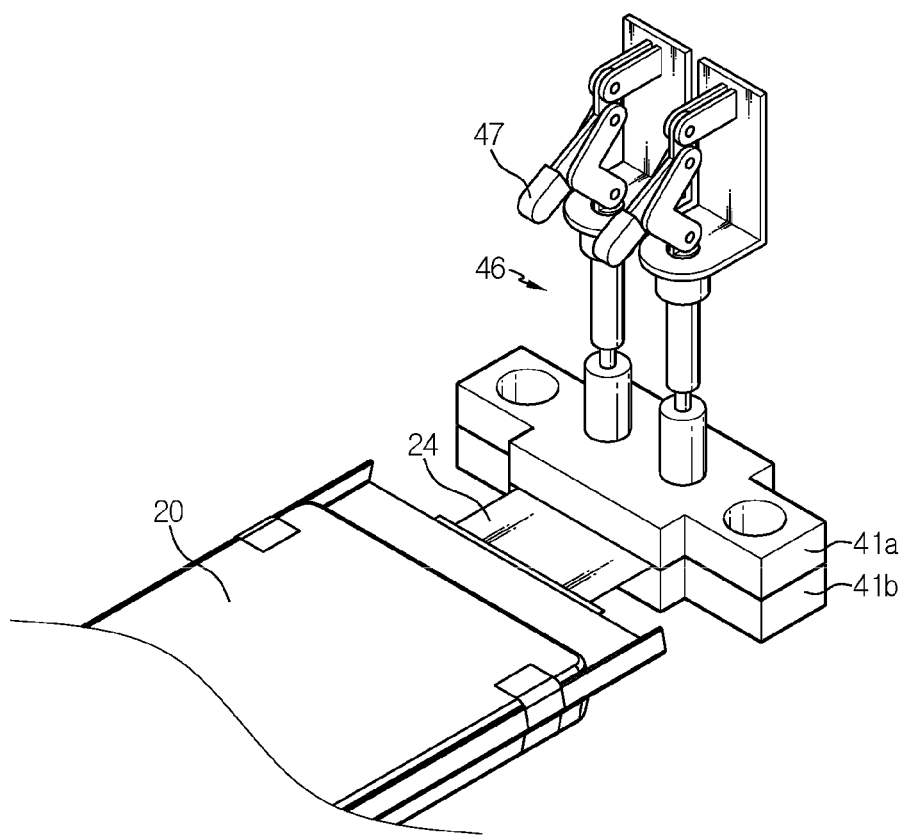
FIGS. 10 and 11 are perspective views illustrating a method of using an embodiment of a lead jig.
Figure 11:
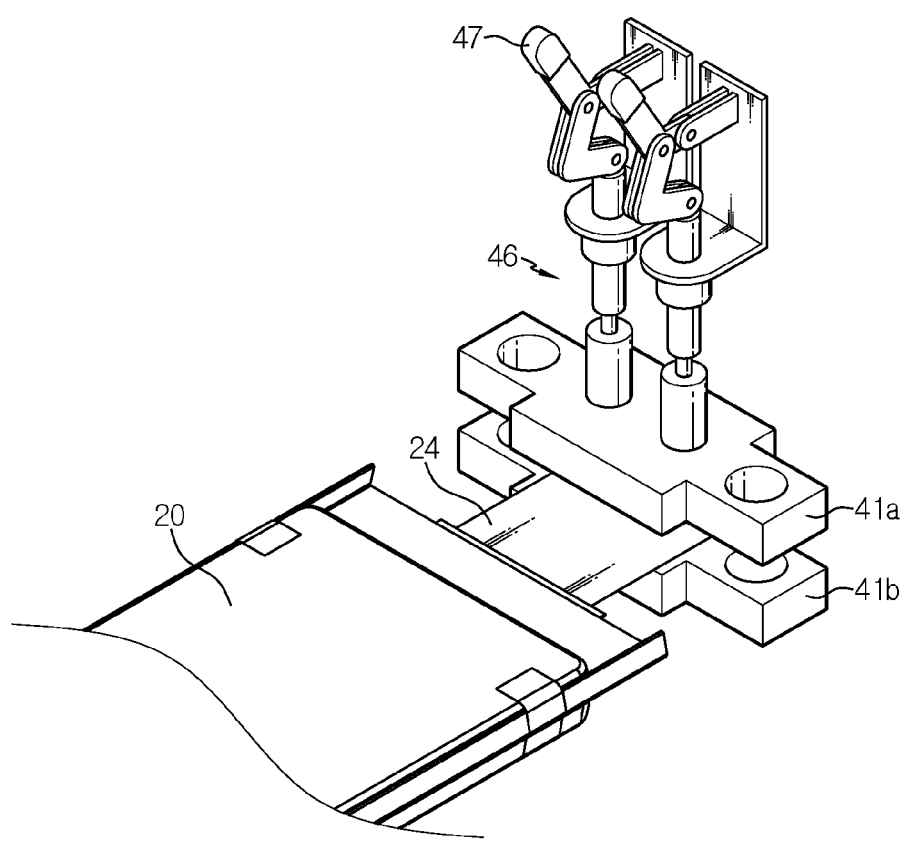

FIGS. 8 to 11 are diagrams detailing an embodiment of the lead jig 40, and in particular, FIGS. 8 and 9 are side views illustrating a method of use, and FIGS. 10 and 11 are perspective views illustrating a method of use. Although the battery cell 20 is received in the cartridge 30 and connected to the lead jig 40, FIGS. 8 to 11 show an example of connecting the battery cell 20 for illustration.

The adjustment member 43 of the lead jig 40 is a lever member 45. The lever member 45 works with the movement of one of the pair of conductive plates 41a, 41b, i.e., the upper conductive plate 41a closer to and away from the lead 24.

FIG. 8 is a side view showing the connection of the lead 24 of the battery cell 20 using the lever member 45, and FIG. 9 is a side view showing the release of connection of the lead 24 of the battery cell 20 using the lever member 45.

FIG. 10 is a perspective view showing the connection of the lead 24 of the battery cell 20 using the lever member 45, and FIG. 11 is a perspective view showing the release of connection of the lead 24 of the battery cell 20 using the lever member 45.

That is, the lever member 45 includes a drive 46 to drive the upper conductive plate 41a to make a vertical motion and a lever 47 to vertically manipulate the drive 46, and when the lever 47 is lowered, the drive 46 is lowered and the upper conductive plate 41a connected thereto moves closer to the lead 24, and when the lever 47 is raised, the drive 46 is raised and the upper conductive plate 41a connected thereto moves away from the lead 24.

Figure 12:
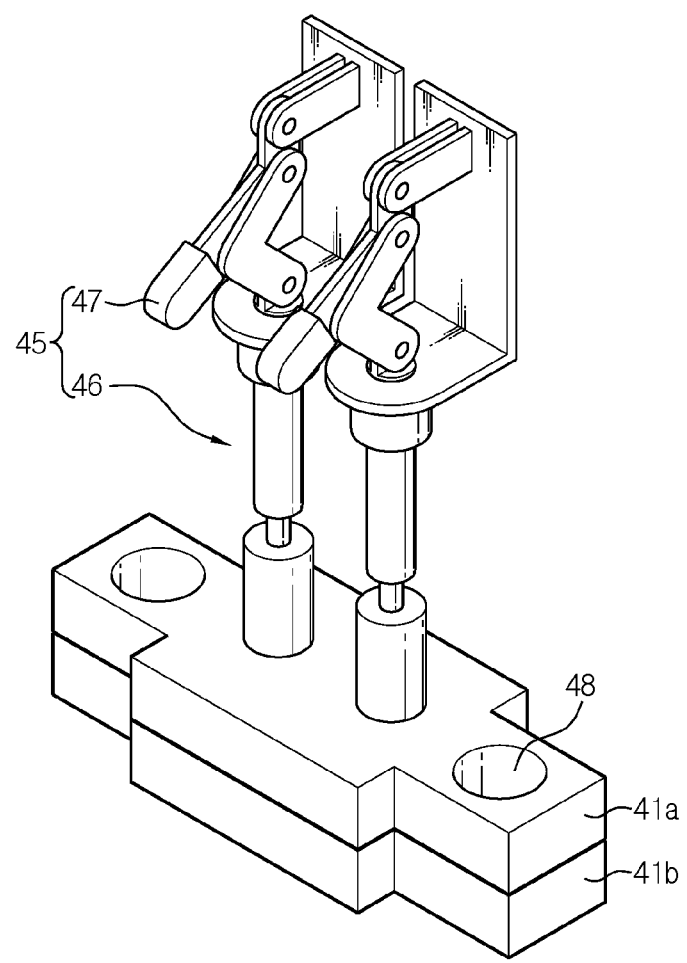
FIGS. 12 and 13 are perspective views illustrating an embodiment of a lead jig for connection of a battery cell and release of connection.
Figure 13:
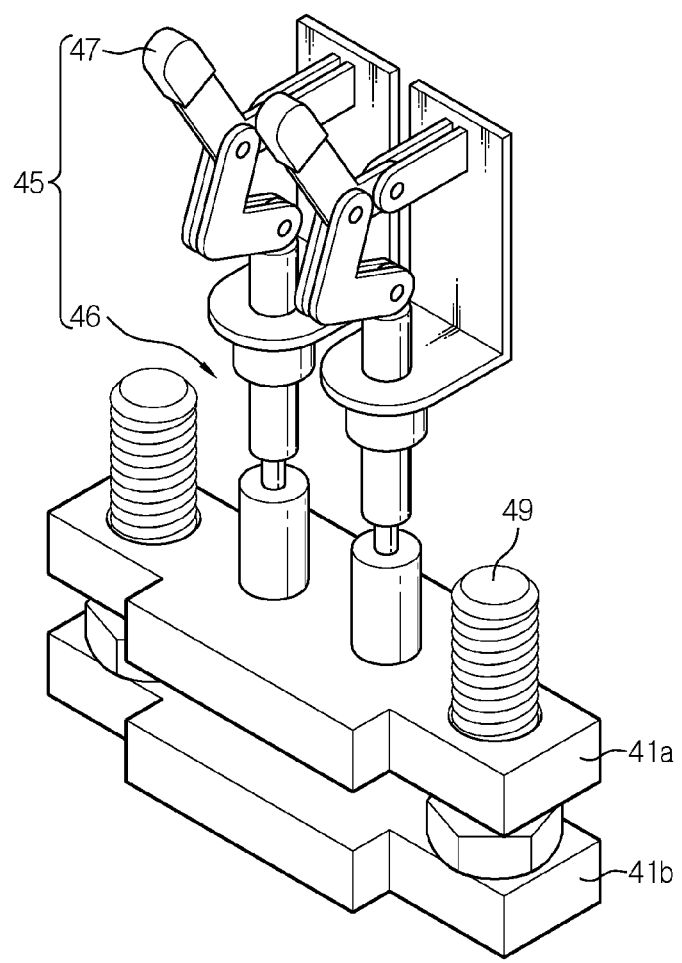

FIGS. 12 and 13 are perspective views illustrating an embodiment of the lead jig for connection of the battery cell and release of connection.

FIG. 12 is a perspective view showing the connection of the lead of the battery cell using the lever member 45, and FIG. 13 is a perspective view showing the release of connection of the lead of the battery cell using the lever member 45. The pair of conductive plates 41a, 41b further include the hole 48, and a screw 49 is added thereto. In FIG. 12, the lever 47 is in lower position, the drive 46 is in lower position, and the upper conductive plate 41a connected thereto is close contact with the lower conductive plate 41b. In FIG. 13, the lever 47 is in upper position, the drive 46 is in upper position, and the upper conductive plate 41a connected thereto is spaced apart from the lower conductive plate 41b. FIG. 12 shows the absence of the screw 49, and FIG. 13 shows the presence of the screw 49.

Figure 14:
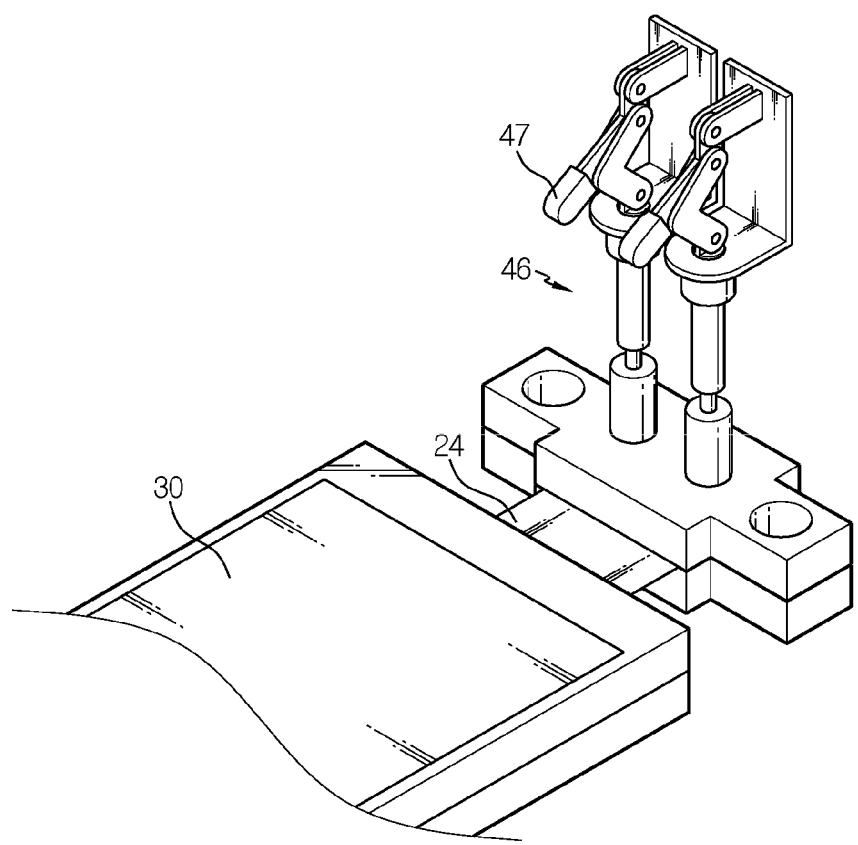
FIG. 14 is a perspective view of connection of a lead of a battery cell using an embodiment of a lead jig.

FIG. 14 is a perspective view of connection of the lead of the battery cell using an embodiment of the lead jig. As shown, in actual use, the battery cell 20 is received in the cartridge 30, and connection is made by the unit of the cartridge 30.

In case that the battery cell 20 is received in the casing 10 and assembled, when the two leads 24 of the corresponding battery cell 20 are interposed between each conductive plate 41a, 41b disposed outside of the leads 24, and the conductive plates 41a, 41b are brought into contact with each other using the lever member 45 on the two sides, the leads 24 are compressed to establish an electrical connection. In case that a problem occurs in any battery cell 20 while in use, when replacing the corresponding battery cell 20, the lead 24 may be removed simply by separating the conductive plates 41a, 41b using the lever member 45 which adjusts the conductive plates 41a, 41b compressing the lead 24 of the corresponding battery cell 20, and the battery cell 20 may be removed from the casing 10 by removing the other lead 24 in the same way, so maintenance and repair is feasible and work is very simple. Accordingly, in the coupling of the battery cell 20, workability is good and the maintenance and repair performance is excellent.

Since the battery pack 100 of the present disclosure includes the complete system 50 separated from the casing 10, to use, just combine the battery cell 20 with the cartridge 30 and the lead jig 40.

The battery pack 100 may be used as a battery pack for a home ESS system. Since the cartridge 30 in which the battery cell 20 is received and the component for connection between the leads 24 are assembled/disassembled or attached/detached, it is possible to separate and install the battery cell 20 in a straightforward manner by mounting/demounting the lead jig 40 and the cartridge 30. Accordingly, it is possible to reduce the work burden and eliminate the need to replace the entire module or cell when a problem occurs in a specific cell. Accordingly, since the customer only has to replace the specific cell at which the problem occurred, it is possible to reduce the A/S costs, thereby reducing the maintenance costs.

Additionally, it is unnecessary to weld the leads of the battery cells 20 before providing to the customer, leading to cost savings. It is possible to reduce damage to the casing that may occur during transportation in the form of finished products. Since the battery cell, the casing and the system may be separately delivered, it is possible to achieve flexibility in products supply, thereby improving the efficiency.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery pack, comprising:
a casing;
at least two battery cells; and
a system including at least two cartridges in which the at least two battery cells are respectively received and a lead jig,
wherein the at least two cartridges are configured to be opened and closed to attach and detach a respective one of the at least two battery cells,
wherein the lead jig is configured to be mounted on and demounted from a lead of a battery cell of the at least two battery cells,
wherein the lead jig has a pair of conductive plates which are parallel and movable relative to one another in a linear direction, and
wherein, when the at least two battery cells are received in the at least two cartridges and stacked in a thickness direction, and the lead jig is mounted on the lead of the battery cell, an electrical connection is established between the at least two battery cells without welding the leads of the at least two battery cells.

2. The battery pack according to claim 1, wherein each of the at least two battery cells is a pouch type secondary battery of a flat shape including a laminated film for hermetic seal and the lead extending in two directions.

3. The battery pack according to claim 2, wherein each battery cell of the at least two battery cells has two leads, the two leads extending from each of two ends of the battery cell, respectively.

4. The battery pack according to claim 1, wherein the casing includes a case configured to receive the at least two battery cells to stack the at least two battery cells in the thickness direction and having an opening formed in at least one end.

5. The battery pack according to claim 1, wherein the at least two cartridges are press-fit into the casing.

6. The battery pack according to claim 1, wherein each cartridge of the at least two cartridges includes a pair of frames to support edges of the battery cell while exposing the lead of the battery cell, and snap buttons disposed on opposing sides between the pair of frames.

7. The battery pack according to claim 1, wherein the lead jig further includes:
an adjustment member connected to reduce a distance between the conductive plates so that the pair of conductive plates compress the lead, or increase the distance between the conductive plates to separate the conductive plates from the lead.

8. The battery pack according to claim 7, wherein the adjustment member is a lever member which moves one of the pair of conductive plates closer to and away from the lead.

9. The battery pack according to claim 1, wherein the lead jig further includes a connecting bar to connect in series the lead of one battery cell of the at least two battery cells to the lead of an adjacent battery cell of the at least two battery cells.

* * * * *